US008891600B2

(12) United States Patent
Kaneko

(10) Patent No.: US 8,891,600 B2
(45) Date of Patent: Nov. 18, 2014

(54) NETWORK DEVICE

(75) Inventor: Yohei Kaneko, Kyoto (JP)

(73) Assignee: Panasonic Corporation, Osaka (JP)

(*) Notice: Subject to any disclaimer, the term of this patent is extended or adjusted under 35 U.S.C. 154(b) by 0 days.

(21) Appl. No.: 13/561,426

(22) Filed: Jul. 30, 2012

(65) Prior Publication Data

US 2012/0287975 A1 Nov. 15, 2012

Related U.S. Application Data

(63) Continuation of application No. PCT/JP2011/000113, filed on Jan. 13, 2011.

(30) Foreign Application Priority Data

Feb. 1, 2010 (JP) ................................ 2010-020034

(51) Int. Cl.
*H04B 1/38* (2006.01)
*H04L 12/26* (2006.01)
*H04L 12/12* (2006.01)

(52) U.S. Cl.
CPC ............. *H04L 12/12* (2013.01); *Y02B 60/32* (2013.01); *H04L 43/0817* (2013.01); *Y02B 60/35* (2013.01); *Y02B 60/34* (2013.01)
USPC ............ 375/221; 375/220; 375/222; 713/323

(58) Field of Classification Search
CPC ..... H04L 12/12; H04L 43/08; H04L 43/0805; H04L 43/0811; H04L 43/0817; H04L 43/0823; Y02B 60/34; Y02B 60/35
USPC ............ 375/219–222; 709/232; 713/320, 323
See application file for complete search history.

(56) References Cited

U.S. PATENT DOCUMENTS

| 6,026,494 | A | 2/2000 | Foster | |
|---|---|---|---|---|
| 7,278,039 | B1 * | 10/2007 | Lo | 713/320 |
| 7,392,412 | B1 * | 6/2008 | Lo | 713/320 |
| 2005/0027876 | A1 | 2/2005 | Umei et al. | |
| 2008/0170495 | A1 * | 7/2008 | Monse et al. | 370/223 |
| 2009/0207042 | A1 * | 8/2009 | Park et al. | 340/870.02 |
| 2010/0217791 | A1 * | 8/2010 | Nakamura | 709/201 |

FOREIGN PATENT DOCUMENTS

| JP | 58-131845 | 8/1983 |
|---|---|---|
| JP | 2-36642 | 2/1990 |
| JP | 2-210933 | 8/1990 |
| JP | 2002-512458 | 4/2002 |

(Continued)

OTHER PUBLICATIONS

International Search Report (in English language) issued in International (PCT) Application No. PCT/JP2011/000113 on Feb. 8, 2011.

*Primary Examiner* — David B. Lugo
(74) *Attorney, Agent, or Firm* — Wenderoth, Lind & Ponack, L.L.P.

(57) ABSTRACT

A network device includes: a connector connected to a network; a receiving line connected to the connector; a transmitting line connected to the connector; a communication control unit configured to control communication with an external network device by receiving a signal from the network through the connector and the receiving line, and transmitting the signal to the network through the transmitting line and the connector; and a loop-back processing unit configured to loop back the signal transmitted through the receiving line, to the transmitting line when the communication control unit is in a power-off state or a standby state.

2 Claims, 11 Drawing Sheets

(56) References Cited

FOREIGN PATENT DOCUMENTS

| JP | 2005-65216 | 3/2005 |
| JP | 2007-259339 | 10/2007 |
| JP | 2010-193126 | 9/2010 |
| WO | 99/54806 | 10/1999 |

* cited by examiner

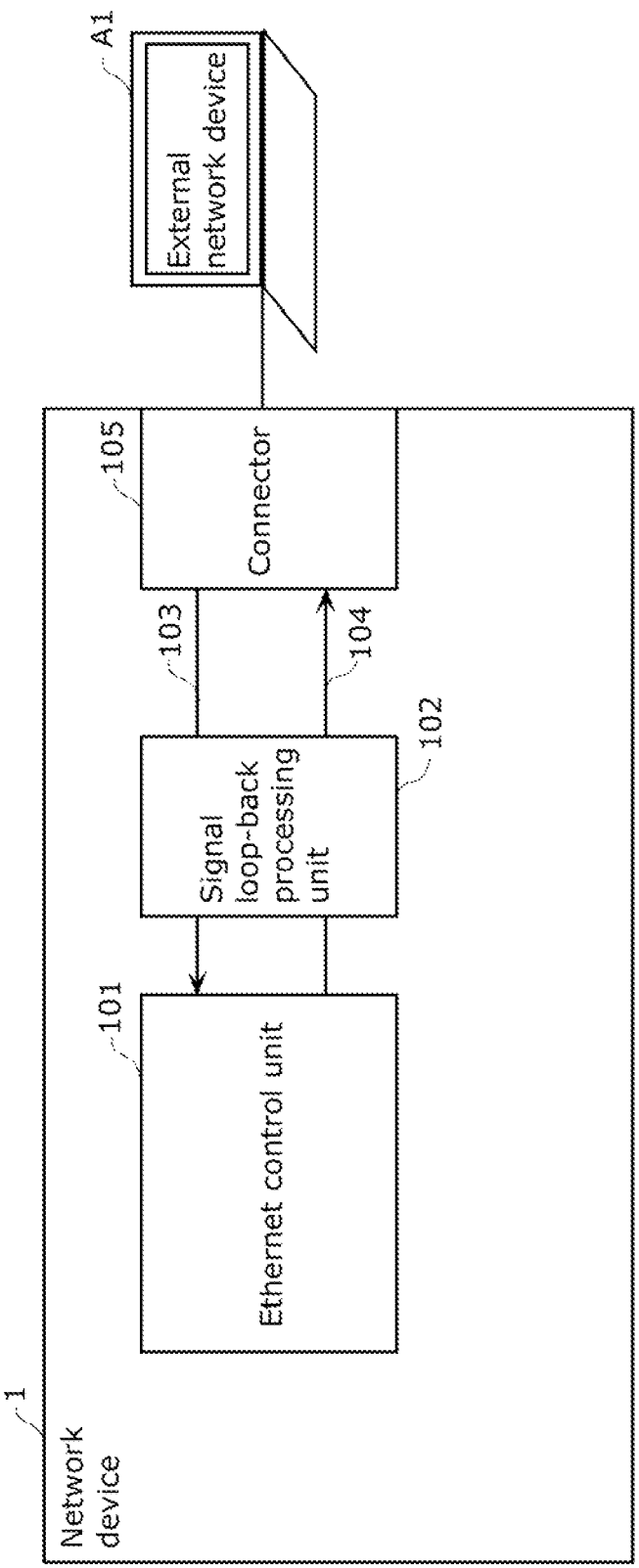

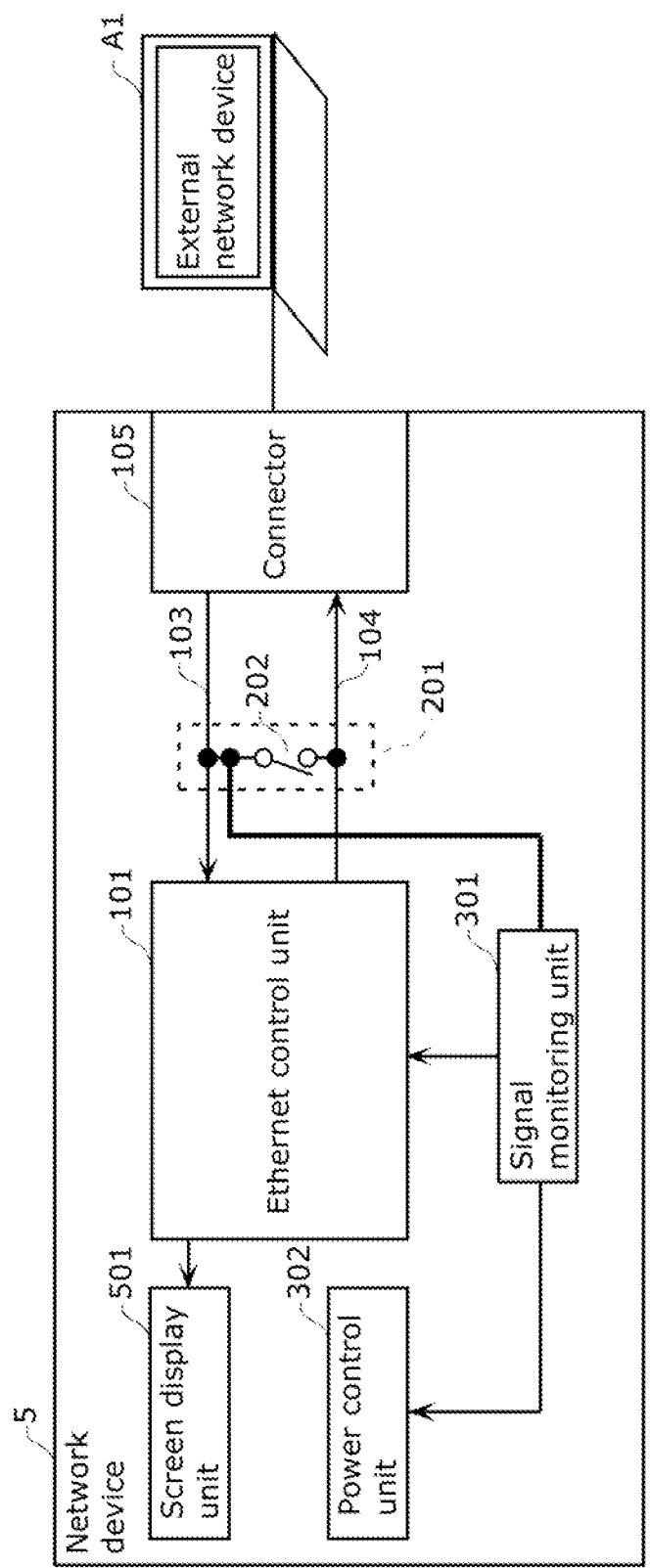

NETWORK DEVICE

CROSS REFERENCE TO RELATED APPLICATION

This is a continuation application of PCT Patent Application No. PCT/JP2011/000113 filed on Jan. 13, 2011, designating the United States of America, which is based on and claims priority of Japanese Patent Application No. 2010-020034 filed on Feb. 1, 2010. The entire disclosures of the above-identified applications, including the specifications, drawings and claims are incorporated herein by reference in their entirety.

TECHNICAL FIELD

The present invention relates to a network device having a power saving function.

BACKGROUND ART

In recent years, Ethernet® supports high-speed data communication of 1 Gbps or 10 Gbps. Thus, network devices using Ethernet tend to consume a larger amount of power. In particular, power saving in the embedded devices is requested.

Power is saved depending on an active or inactive link state between a conventional Ethernet network device and an external network device.

Such a conventional technique is known, for example, the technique disclosed in PTL 1.

CITATION LIST

Patent Literature

[PTL 1] Japanese Unexamined Patent Application Publication No. 2002-512458

SUMMARY OF INVENTION

Technical Problem

However, when the conventional Ethernet network device is turned OFF, the link state with the external network device connected through an Ethernet cable is always made inactive, and it is determined that there is no communication partner with the external network device. Accordingly, the external network device does not transmit any Ethernet frame to the Ethernet network device.

Accordingly, when the link state is active, that is, when there is a possibility of receiving the Ethernet frame from the external network device, there are problems that the Ethernet network device has to be turned ON and the power cannot be sufficiently saved.

The present invention has been conceived to solve the problems, and has an object of providing a network device that can maintain the link state with the external network device as active, even when an entire or a part of the power of the network device is turned OFF.

Solution to Problem

In order to achieve the object, a network device according to an aspect of the present invention is a network device including: a connector connected to a network; a receiving line connected to the connector; a transmitting line connected to the connector; a communication control unit configured to control communication with an external network device by receiving a signal from the network through the connector and the receiving line, and transmitting the signal to the network through the transmitting line and the connector; and a loop-back processing unit configured to loop back the signal transmitted through the receiving line, to the transmitting line when the communication control unit is in a power-off state or a standby state.

With this configuration, even when the network device is in the power-off state or the standby state, the signal is looped back from the receiving line to the transmitting line. Thus, the link state with the network can be maintained. In other words, even when the network device is in the power-off state or the standby state, the link state maintaining frame (link signal) from the receiving line is responded by the loop back operation. Thus, it is possible to prevent the link state between the network device and the network from being interrupted.

Here, the network may be Ethernet.

With this configuration, when the network device is in the power-off state or the standby state, the link signal of Ethernet is looped back, so that the link state can be maintained.

Here, the loop-back processing unit may include a switch connected between the receiving line and the transmitting line.

When the network device is in the power-off state or the standby state, the link state can be maintained with the simplified configuration. In other words, the network device according to the aspect of the present invention can be implemented with lower cost and lower power consumption.

Here, the network device may further include: a power control unit configured to turn ON or OFF the communication control unit; and a monitoring unit configured to monitor the signal transmitted through the receiving line, and determine whether or not the signal has been transmitted to the network device, wherein the power control unit may be configured to turn ON the communication control unit when the monitoring unit determines that the signal has been transmitted to the network device.

With this configuration, upon receipt of the signal having been transmitted to the network device, a state can be easily restored from the power-off state or the power saving state by automatically turning ON the communication control unit.

Here, the network device may further include a receiving unit configured to store the signal transmitted through the receiving line when the communication control unit is in the power-off state or the standby state, wherein the communication control unit may be further configured to process the signal stored by the receiving unit when the communication control unit is turned ON.

With this configuration, the power consumption other than the case where communication is necessary can be suppressed at minimum. Furthermore, it is possible to prevent the loss in the signal that has been transmitted from the external network device to the network device when the communication control unit is in the power-off state or the standby state.

Here, the receiving unit may be configured to store the signal determined by the monitoring unit as having been transmitted to the network device, the signal arriving from a time when the network device is in the power-off state or the standby state to a time when the network device is turned ON.

With this configuration, it is possible to prevent the loss in the signal that has been transmitted from the external network to the network device when the communication control unit is in the power-off state or the standby state. The power for the signal transmitted from the external network device can be significantly saved in an active link state and a communicable state.

Here, the network device may further include a power control unit configured to turn ON or OFF the communication control unit; and a monitoring unit configured to monitor the signal transmitted through the receiving line, and determine whether or not the signal has been transmitted to the network device, wherein the power control unit may be configured to turn ON the network device when the monitoring unit determines that the signal has been transmitted to the network device.

With this configuration, upon receipt of the signal having been transmitted to the network device, a state can be easily restored from the power-off state or the power saving state by automatically turning ON the network device.

Here, the network device may further include a receiving unit configured to store the signal transmitted through the receiving line when the network device is in the power-off state or the standby state, wherein the communication control unit may be further configured to process the signal stored by the receiving unit when the network device is turned ON.

With this configuration, it is possible to prevent the loss in the signal having been transmitted from the external network device to the network device when the communication control unit is in the power-off state or the standby state. Furthermore, the power for the signal transmitted from the external network device can be significantly saved in an active link state and a communicable state.

Here, the receiving unit may be configured to store the signal determined by the monitoring unit as having been transmitted to the network device, the signal arriving from a time when the network device is in the power-off state or the standby state to a time when the network device is turned ON.

With the configuration, the communication control unit can efficiently and smoothly transition from the power-off state or the standby state to a start-up state.

Here, the network device may further include a display unit configured to display power consumption of the network device.

With this configuration, the power consumption can be clearly presented to the user.

Here, the network device may further include a display unit configured to display a state of the communication control unit, wherein the state of the communication control unit may include one of the power-off state, the standby state, and a start-up state.

With this configuration, the state of the network device can be clearly presented to the user.

Advantageous Effects of Invention

According to the configuration of the present invention including the signal loop-back processing unit that loops back the signal received from the external network device to the external network device itself, the operation parameter included in the link signal transmitted to the external network device can be used by the own external network device. Thus, there is an advantage of always maintaining the link state with the external network device as active.

BRIEF DESCRIPTION OF DRAWINGS

These and other objects, advantages and features of the invention will become apparent from the following description thereof taken in conjunction with the accompanying drawings that illustrate a specific embodiment of the present invention. In the Drawings:

FIG. 1 is a block diagram illustrating an example of a configuration of a network device according to Embodiment 1;

FIG. 5A is a block diagram illustrating an example of a configuration of a network device according to Embodiment 4;

DESCRIPTION OF EMBODIMENTS

Figure 2A:
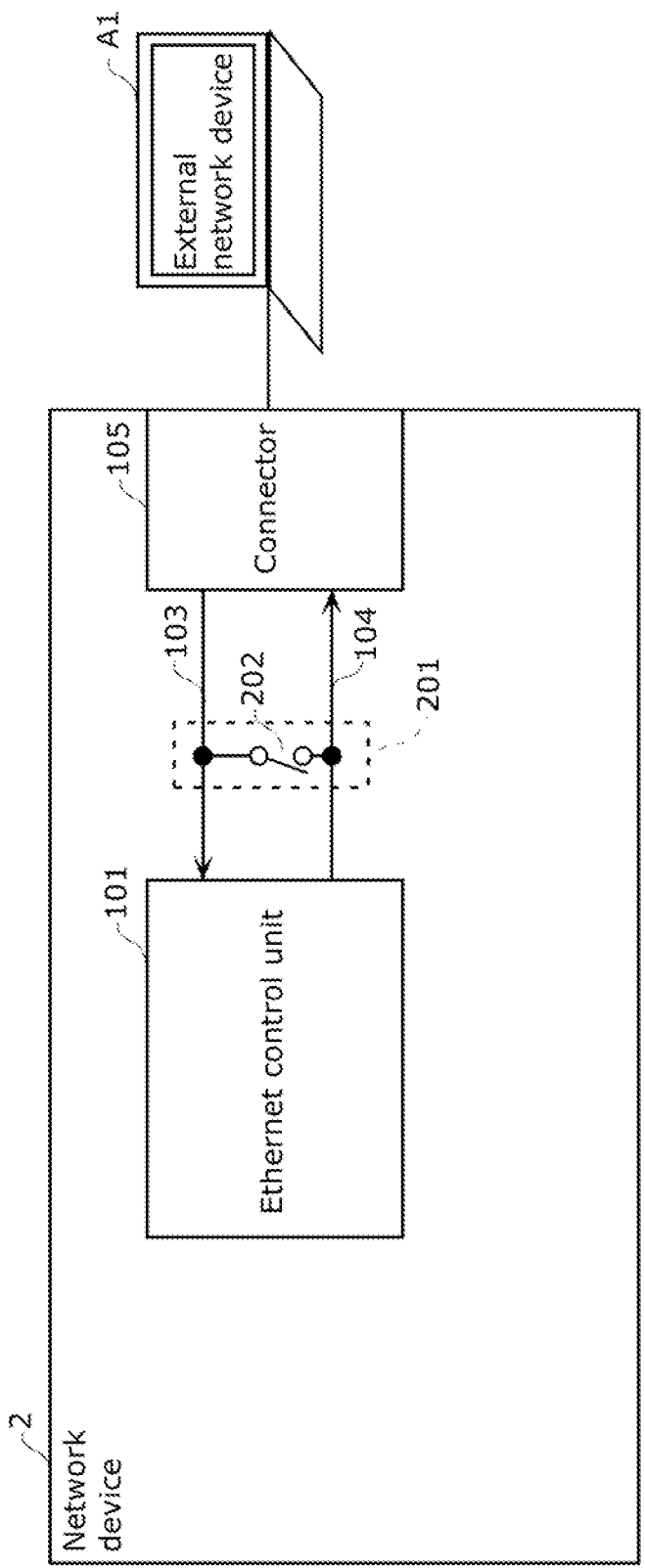
FIG. 2A is a block diagram illustrating an example of a detailed configuration of a network device according to Embodiment 1.

A network device according to Embodiments of the present invention will be described with reference to drawings. There are cases where the description of the same constituent elements denoted by the same reference numerals in each of Embodiments is omitted.

Embodiment 1

FIG. 1 illustrates a network device 1 according to Embodiment 1 and an external network device A1 connected to the network device 1 through an Ethernet® cable. The external network device A1 is a representative one of external network devices over the network.

The network device 1 includes a connector 105, an RX signal line 103, a TX signal line 104, an Ethernet control unit 101, and a signal loop-back processing unit 102.

The connector 105 is connected to a network.

The RX signal line 103 is a receiving line that connects the connector 105 and the Ethernet control unit 101.

The TX signal line 104 is a transmitting line that connects the connector 105 and the Ethernet control unit 101.

The Ethernet control unit 101 is a communication control unit that controls communication with the external network device A1 by receiving a signal from the network through the connector 105 and the RX signal line 103 and transmitting a signal to the network through the TX signal line 104 and the connector 105.

Hereinafter, a case where the network is Ethernet will be described. In such a case, examples of the signal include a link signal and an Ethernet frame. The connector 105 is called an Ethernet connector.

The signal loop-back processing unit 102 loops back the signal from the RX signal line 103 to the transmitting line when the Ethernet control unit 101 is in a power-off state or a standby state. The power-off state is a state, for example, where the power supply or supply of an operating clock signal is stopped. The standby state is, for example, one of states or a combined state of at least two of the states. The states include a state where a part of the power supply is stopped; a state where a low power voltage is supplied; a state where a part of an operating clock signal is stopped; and a state where an operating clock signal at a lower frequency is supplied. The signal loop-back processing unit 102 may have a function that simply connects, for example, the RX signal line 103 to the TX signal line 104, and include, in addition to the connecting function, a signal receiver that increases the reception power from the RX signal line 103, and a signal transceiver (signal driver, signal buffer) that increases the driving capability for the TX signal line 104.

With the configuration in FIG. 1, when the external network device A1 outputs a link signal for checking a link state with the network device 1, the link signal is transferred through the connector 105, the RX signal line 103, the signal loop-back processing unit 102, the TX signal line 104, and the connector 105 in this order, and is looped back to the external network device A1. The loop back operation is an operation when the network device 1 or the Ethernet control unit 101 is turned OFF or in a standby state. When the network device 1 or the Ethernet control unit 101 is turned ON, the link signal conventionally generated by the Ethernet control unit 101 is returned to the external network device A1.

Furthermore, FIG. 2A is a block diagram illustrating an example of a detailed configuration of a network device according to Embodiment 1. A network device 2 in FIG. 2A illustrates that the signal loop-back processing unit 102 in FIG. 1 is a bypass connection 201. The bypass connection 201 includes a switch 202. When the switch 202 is turned ON, the switch 202 connects the RX signal line 103 to the TX signal line 104. The switch 202 may be, for example, a normally-on transistor switch or a normally-on mechanical switch.

With the configuration of FIG. 2A, when the external network device A1 outputs the link signal, the link signal is transferred through the connector 105, the RX signal line 103, the bypass connection 201, the TX signal line 104, and the connector 105 in this order, and is looped back to the external network device A1. The loop back operation is an operation when the network device 2 or the Ethernet control unit 101 is turned OFF. When the network device 2 or the Ethernet control unit 101 is turned ON, the link signal conventionally generated by the Ethernet control unit 101 is returned to the external network device A1. The loop back operation is performed by the switch 202 included in the bypass connection 201.

Figure 2B:
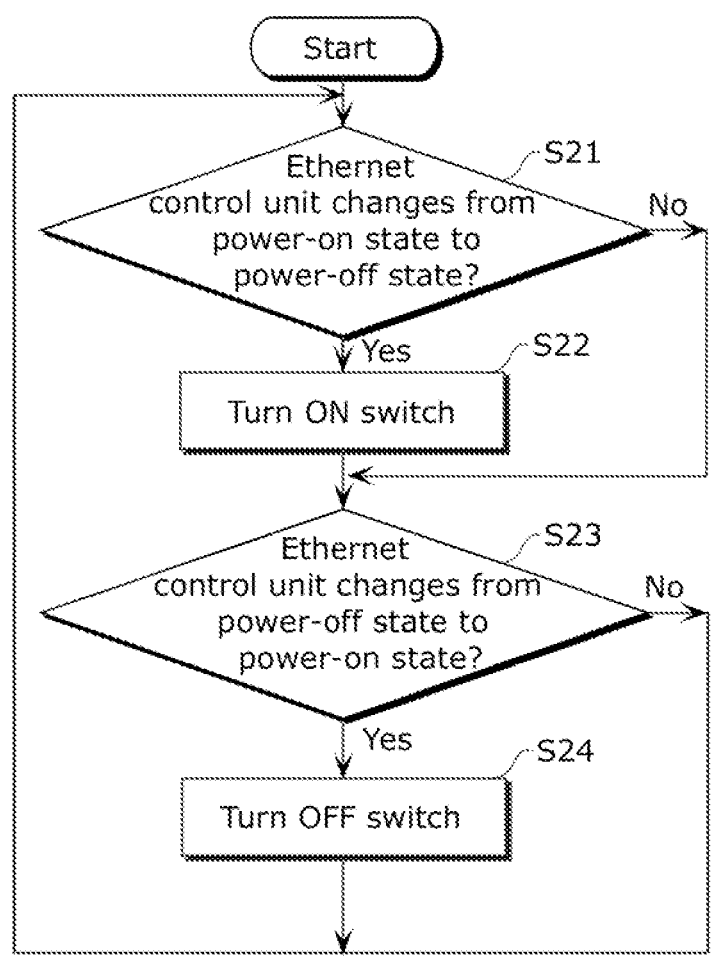
FIG. 2B is a flowchart indicating an example of processes for controlling a switch of a network device according to Embodiment 1.

FIG. 2B is a flowchart indicating an example of processes for controlling the switch of the network device 2 according to Embodiment 1. In FIG. 2B, the network device 2 determines whether the Ethernet control unit 101 changes from a power-on state to a power-off state or a standby state (S21). When the network device 2 determines that the Ethernet control unit 101 changes from the power-on state to the power-off state or the standby state, the network device 2 turns ON the switch 202 (S22). Furthermore, when the network device 2 determines whether the Ethernet control unit 101 changes from the power-off state or the standby state to the power-on state (S23) and determines that the Ethernet control unit 101 changes from the power-off state or the standby state to the power-on state, the network device 2 turns OFF the switch 202 (S24).

When the switch 202 is a normally-on switch, Steps S21 and S22 are automatically performed by the switch 202. When the switch 202 is a normally-off switch, Steps S23 and S24 are automatically performed by the switch 202.

Since the network device according to Embodiment 1 includes the signal loop-back processing unit 102 or the bypass connection 201 that sends the signal received from the external network device A1 back to the external network device A1, even when the Ethernet control unit 101 or the network device is turned OFF, the external network device A1 determines the link state with the network device as always active. Such an operation is possible using the characteristics of the link signal in Ethernet. The characteristics are that the parameter check is always successful and the link state becomes active because an operation parameter included in the link signal indicates the external network device A1.

In the configuration of FIG. 2A in particular, the bypass connection 201 can solely loop back the link signal. Accordingly, the configuration that requires low cost and less power consumption can be employed.

As such, even when the network device 1 is in the power-off state or the standby state, the signal is looped back from the RX signal line 103 to the TX signal line 104. Thus, the link state with the network can be maintained. In other words, even when the network device 1 is in the power-off state or the standby state, the link state maintaining frame (link signal) from the receiving line is responded by the loop back operation. Thus, it is possible to prevent the link state between the network device and the network from being interrupted.

Embodiment 2

Figure 3A:
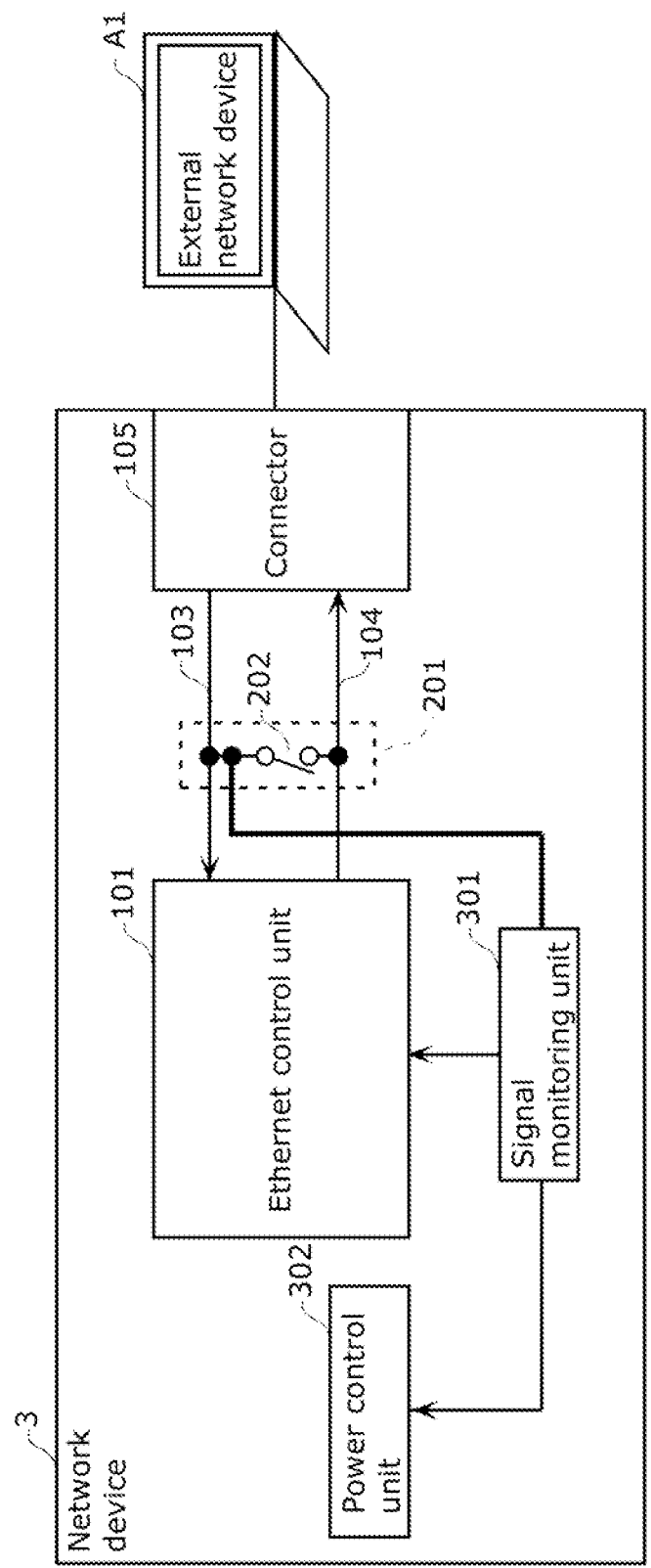
FIG. 3A is a block diagram illustrating an example of a configuration of a network device according to Embodiment 2.

A network device 3 in FIG. 3A according to Embodiment 2 further includes a signal monitoring unit 301 and a power control unit 302 in addition to the configuration of the network device 2A according to Embodiment 1. Although FIG. 3A illustrates an example of the network device 3 including the bypass connection 201, the network device 3 may include the signal loop-back processing unit 102 in FIG. 1 instead of the bypass connection 201.

Figure 6:
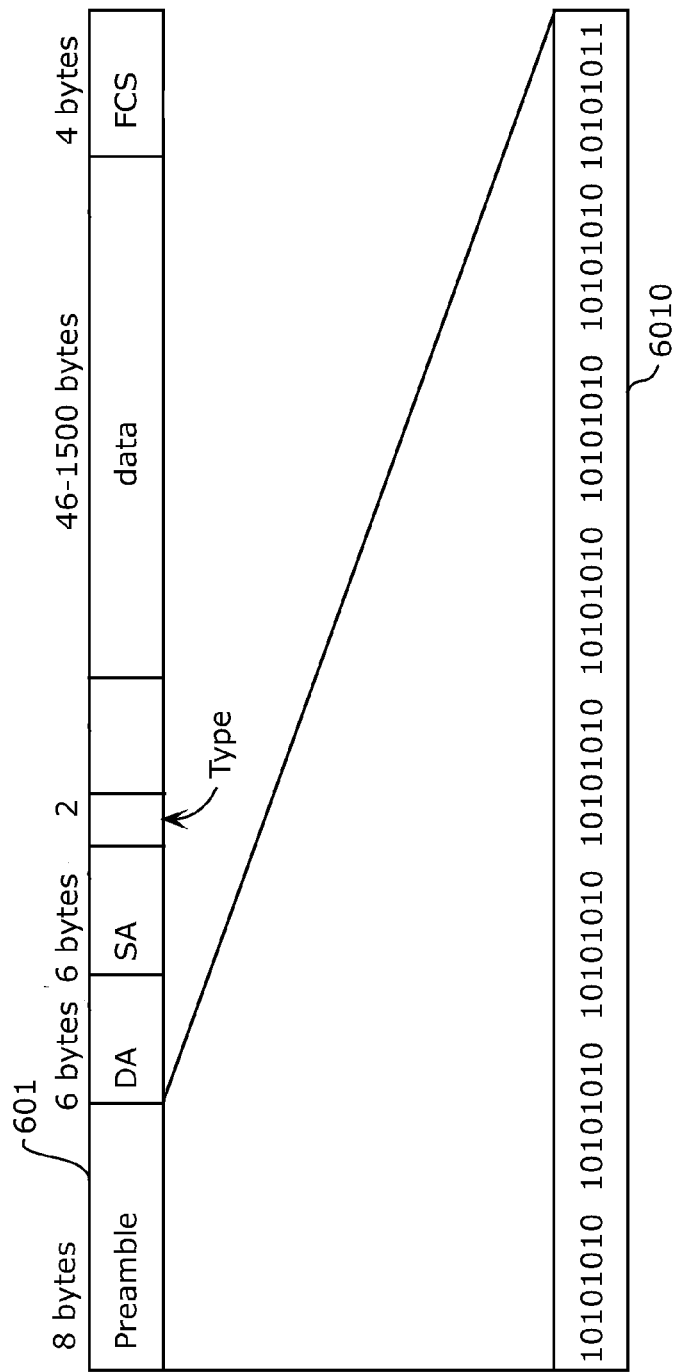
FIG. 6 illustrates a frame structure and a preamble structure of Ethernet.

When the external network device A1 transmits an Ethernet frame and a preamble signal in FIG. 6 to the network device 3, the signals are transferred through the connector 105, the RX signal line 103, and the bypass connection 201 in this order. The signal monitoring unit 301 monitors these signals transferred to the bypass connection 201 to detect different signals from the link signal. Here, the preamble signal functions as a prior signal indicating transmission of an Ethernet frame.

FIG. 6 illustrates the Ethernet frame and the preamble signal. Examples of a method of detecting a signal different from the link signal include a method of detecting the preamble signal in FIG. 6. A preamble signal 601 has a fixed bit pattern of 8 bytes. The signal monitoring unit 301 can determine occurrence of the Ethernet frame by detecting change in a signal different from the link signal, that is, detecting a preamble bit pattern 6010. Furthermore, the signal monitoring unit 301 can determine whether or not the Ethernet frame is transmitted to the own network device by determining whether or not a destination address DA matches an address of the own network device.

The signal monitoring unit 301 notifies the power control unit 302 of the change in a signal state in the bypass connection 201. Then, the power control unit 302 turns ON the Ethernet control unit 101 or the network device 3, according to the change in the signal state in the bypass connection 201 notified from the signal monitoring unit 301. Here, the change in a signal state indicates reception of not a link signal but an Ethernet frame or that the received Ethernet frame has been transmitted to the own network device. The other operations such as the operation for looping back the link signal to the external network device A1 are the same as those in Embodiment 1. Thus, the description thereof is omitted.

Figure 3B:
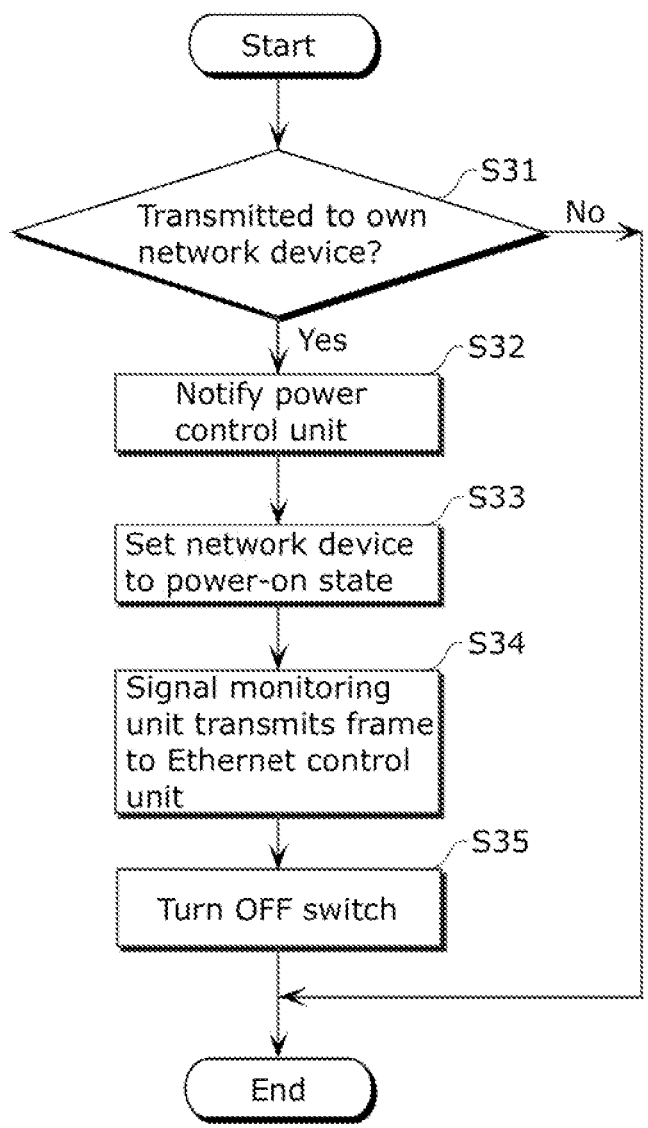
FIG. 3B is a flowchart indicating an example of processes for restoring a network device according to Embodiment 2.

FIG. 3B is a flowchart indicating an example of processes for restoring the network device 3 according to Embodiment 2. The restoration processes are processes for restoring the network device 2 or the Ethernet control unit 101 to the power-on state when the signal monitoring unit 301 detects an Ethernet frame different from the link signal.

According to FIG. 3B, the signal monitoring unit 301 monitors a signal received from the RX signal line 103, and determines whether or not the signal has been transmitted to the own network device (S31). When the received signal is an Ethernet frame having been transmitted to the own network device, the signal monitoring unit 301 notifies the power control unit 302 of the information (S32). The power control unit 302 that receives the notification sets the Ethernet control unit 101 or the network device 3 to the power-on state (S33). Here, the signal monitoring unit 301 transmits the received signal to the Ethernet control unit 101 (S34), and turns OFF the switch 202 (S35).

At Step S34, the signal monitoring unit 301 transmits, to the Ethernet control unit 101, at least fields after a source address SA in the received signal (Ethernet frame) having been transmitted to the own network device. Accordingly, the Ethernet control unit 101 can process the Ethernet frame having been transmitted to the own network device, without any loss.

When the start-up timing (restoration timing to the power-on state) of the network device 3 at Step S33 is faster than the timing at which the signal monitoring unit 301 transmits a frame to the Ethernet control unit 101 at Step S34, the Ethernet control unit 101 can process the Ethernet frame transmitted from the signal monitoring unit 301, which has been transmitted from the external network device A1 to the own network device.

Conversely, when the start-up timing (restoration timing to the power-on state) of the network device 3 at Step S33 is slower than the timing at which the signal monitoring unit 301 transmits the frame to the Ethernet control unit 101 at Step S34, the Ethernet frame transmitted from the signal monitoring unit 301 is lost. Here, the Ethernet frame has been transmitted from the external network device A1 to the own network device.

Whether the restoration timing is faster or slower than the transmission timing depends on the hardware structure of the network device 3. Thus, Step S34 is effective when the network device 3 uses the hardware structure in which the restoration timing is faster than the transmission timing.

The power control unit 302 may turn ON the network device 3 or only the Ethernet control unit 101, according to the use.

Furthermore, upon detection of the change in the signal different from the link signal, the signal monitoring unit 301 may notify the Ethernet control unit 101 of the start-up not through the power control unit 302.

Except for the case where the network device receives an Ethernet frame from the external network device A1 and processes it, the network device can be turned OFF with the configuration according to Embodiment 2. Thus, the standby power consumption of Ethernet can be extremely reduced. Furthermore, the network device 3 can easily restore the power-on state from the power saving state, by being normally turned OFF and by being automatically turned ON only when there is a change in a signal on Ethernet (for example, reception of an Ethernet frame).

In recent years, as the communication through Ethernet has been accelerated, such as 1 Gbps or 10 Gbps, the Ethernet network devices tend to increase the power consumption. In particular, the power consumption by the embedded device is greatly increased. Thus, Embodiment 2 describes the extremely effective technique of low cost for turning OFF the network device except for the minimum necessary cases (when the Ethernet frame is processed).

In particular, the technique is effective to a network server system that turns ON a network device using an Ethernet frame.

Embodiment 3

Figure 4A:
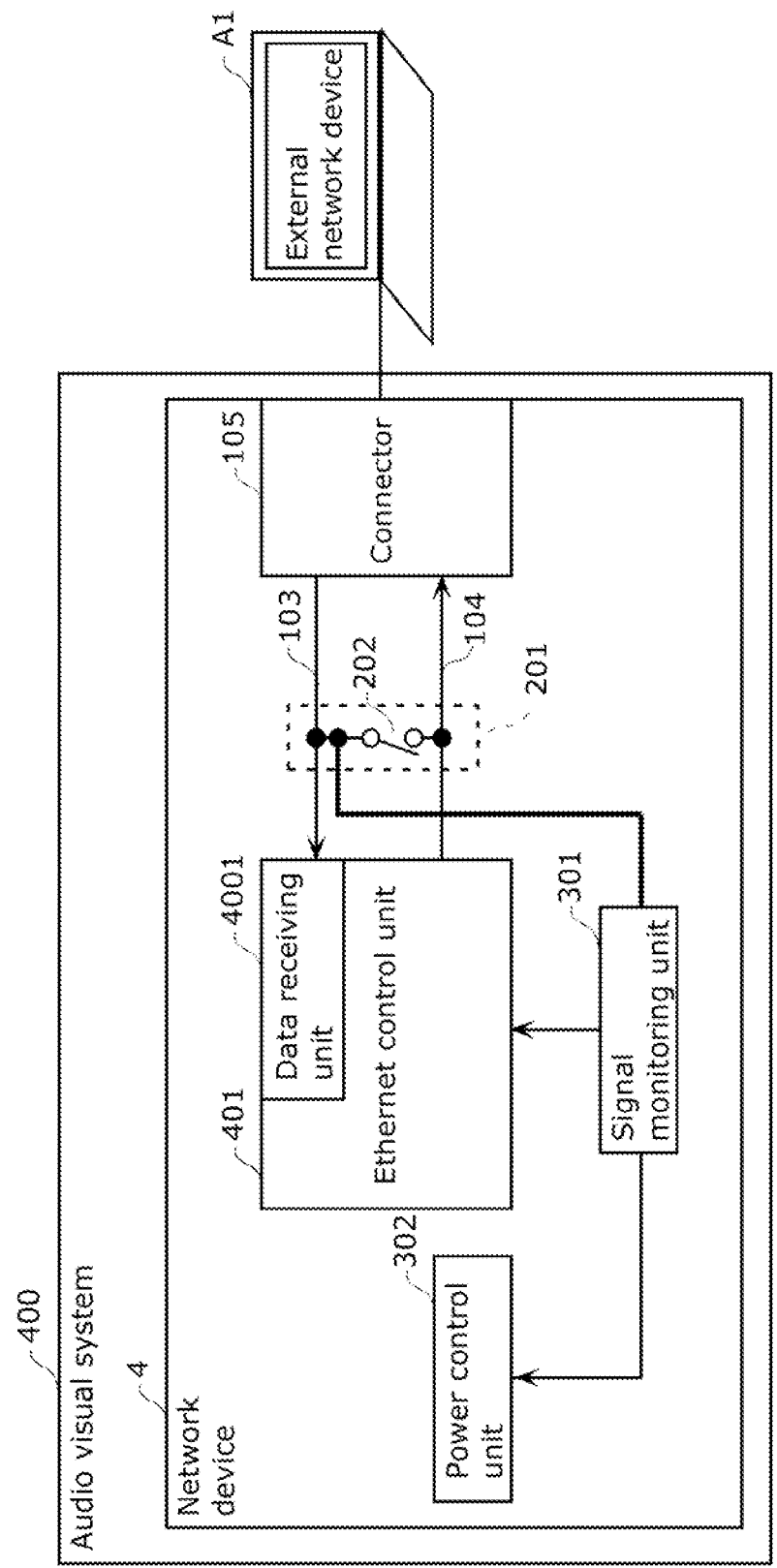
FIG. 4A is a block diagram illustrating an example of a configuration of in a network device according to Embodiment 3.

FIG. 4A is a block diagram illustrating an example of a configuration of an audio visual system 400 including a network device 4 according to Embodiment 3. The audio visual system 400 can be connected to a network, and is a system that records and reproduces a digital audio signal and a digital video signal, such as a digital television, a DVD record player, a blu-ray record player, a digital audio system, and a home server. The network device 4 in FIG. 4A according to Embodiment 3 further includes a data receiving unit 4001 included in an Ethernet control unit 401, in addition to the configuration of the network devices according to Embodiments 1 and 2. Although FIG. 4A illustrates an example of the network device 4 including the bypass connection 201, the network device 4 may include the signal loop-back processing unit 102 in FIG. 1 instead of the bypass connection 201.

The signal monitoring unit 301 notifies the power control unit 302 of the change in a signal state in the bypass connection 201. Then, the power control unit 302 turns ON the data receiving unit 4001, according to the change in a signal state in the bypass connection 201 notified from the signal monitoring unit 301. Then, the data receiving unit 4001 receives, through the RX signal line 103, the Ethernet frames that are received from the external network device A1 until the network device 4 or the Ethernet control unit 401 is started, and stores the Ethernet frames. The other operations such as the operation for looping back the link signal to the external network device A1 or the method of detecting the change in the signal different from the link signal are the same as those in Embodiments 1 and 2. Thus, the description thereof is omitted.

Figure 4B:
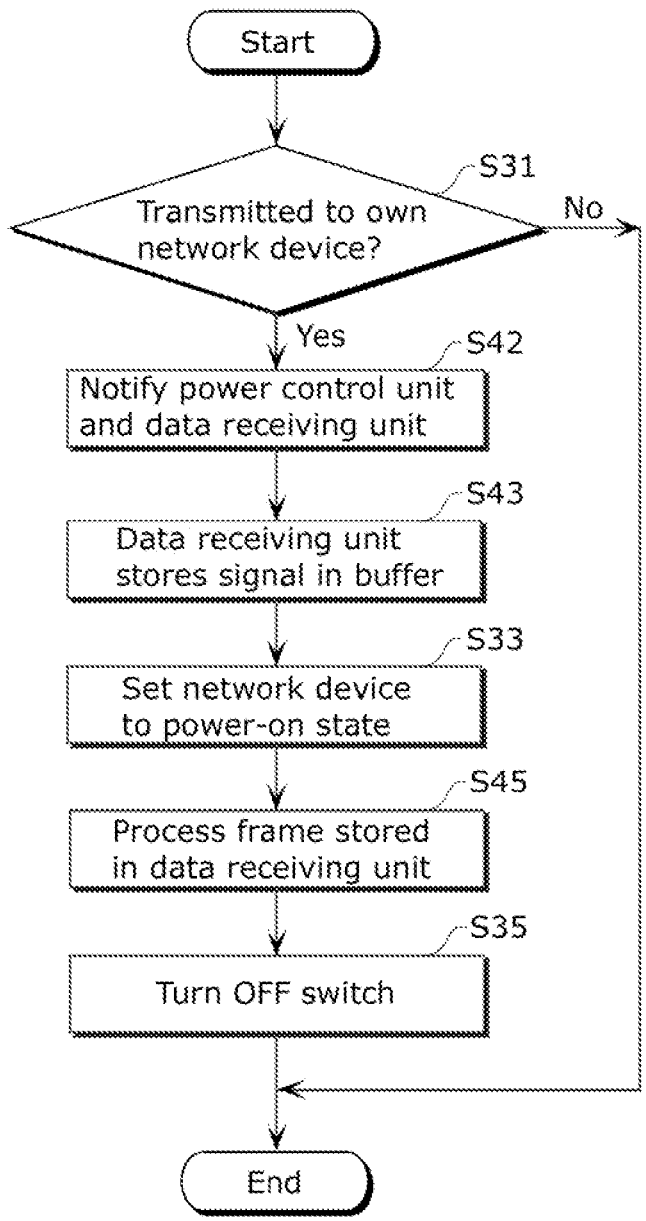
FIG. 4B is a flowchart indicating an example of processes for restoring a network device according to Embodiment 3.

FIG. 4B is a flowchart indicating an example of processes for restoring the network device 4 according to Embodiment 3. FIG. 4B differs from FIG. 3B by including Steps S42 and S43 instead of Step S32, and Step S45 instead of Step S34. The description on the same points is omitted, and the different points will be mainly described.

At Step S42, the signal monitoring unit 301 notifies the power control unit 302 and the data receiving unit 4001 that the received signal is the Ethernet frame having been transmitted to the own network device. The data receiving unit 4001 stores the signal from the RX signal line 103, in an internal receive buffer, and discards the stored signal when no notification is issued (S43). Furthermore, the power control unit 302 that receives the notification sets the Ethernet control unit 101 or the network device 4 to the power-on state (S33). The Ethernet control unit 101 set to the power-on state processes the Ethernet frame stored in the data receiving unit 4001 (S45).

At Step S43, the data receiving unit 4001 stores at least the fields after the source address SA in the received signal (Ethernet frame) having been transmitted to the own network device. The data receiving unit 4001 may store the signal in the internal receive buffer after receiving the notification from the signal monitoring unit 301. Conversely, the data receiving unit 4001 may always store at least one signal (Ethernet frame) even without receiving any notification.

Thus, even when the start-up timing (restoration to the power-on state) of the Ethernet control unit 101 at Step S33 is slower than the timing of the notification at Step S42, the Ethernet frame that has been transmitted to the own network device in a power-off state or a standby state can be processed without any loss.

According to Embodiment 3, the Ethernet frames received from the time when the data receiving unit 4001 is turned ON to the time when the network device 4 or the Ethernet control unit 401 finishes the start-up are stored in the data receiving unit 4001. After the network device 4 or the Ethernet control unit 401 is started, the Ethernet frames stored in the data receiving unit 4001 can be processed. Thus, the network device can greatly save the power by normally turning OFF the network device 4 and accelerating the start up of the data receiving unit 4001 when receiving the Ethernet frames from the external network device A1, in a state where the data communication may be performed on the Ethernet frames transmitted from the external network device A1 during the time when the network device 4 or the Ethernet control unit 401 is started and operated.

In particular, the technique is effective for an embedded network device that desirably reduces the power consumption, because the power consumption can be suppressed at minimum except for the case where the Ethernet communication is necessary.

Figure 4C:
FIG. 4C is a table indicating states of a network device according to Embodiment 3.

FIG. 4C is a table indicating example states of the network device 4 according to Embodiment 3. FIG. 4C indicates the three example states of S1, S2, and S3. "ON" and "OFF" in the column of "Switch" mean continuity and non-continuity of the switch 202, respectively. "ON" and "OFF" in the other columns mean the power-on state and power-off state, respectively. Some of the constituent elements of the audio visual system 400 have different definitions about "ON" and "OFF" from the above definitions.

The state S1 where the audio visual system 400 is "OFF", the data receiving unit 4001 is "ON", the other units (portions other than the data receiving unit 4001 in the Ethernet control unit 401) are "OFF", and the switch 202 is "ON" indicates that the link state of Ethernet is active although the audio visual system 400 is "OFF". In other words, both of the audio visual system 400 and the Ethernet control unit 401 are in the energy-saving mode (power saving state). In the state S1, the signal monitoring unit 301 is in the power-on state. Once the Ethernet frame having been transmitted to the own network device is received in the state S1, the state S1 transitions to the state S2 or S3. The transition from the state S1 to the state S2 occurs, for example, when the network device 4 receives not AV data but an Ethernet frame. The transition from the state S1 to the state S3 occurs, for example, when the network device 4 receives an Ethernet frame including AV data.

The state S1 where the audio visual system 400 is "ON", the data receiving unit 4001 is "ON", the other units are "OFF", and the switch 202 is "ON" indicates that the link state of Ethernet is active although the Ethernet control unit 101 is in the power saving state. The state S1 when the audio visual system 400 is a digital television corresponds to the case where the user is watching the digital television without using Ethernet. The Ethernet control unit 101 is in the power saving state although the link state is active.

The state S2 where the audio visual system 400 is "OFF", the data receiving unit 4001 is "ON", the other units are "ON", and the switch 202 is "OFF" indicates, for example, that Ethernet is used although the user is not watching the audio visual system 400. The state S2 when the audio visual system 400 is a Blu-ray recorder corresponds to the case where the audio visual system 400 receives the AV data from Ethernet and records the data.

The state S3 where the audio visual system 400 is "ON", the data receiving unit 4001 is "ON", the other units are "ON", and the switch 202 is "OFF" indicates, for example, that the user is watching the audio visual system 400 using Ethernet.

The signal monitoring unit 301 may be set to the power saving state or the start-up state in both of the states S2 and S3.

Embodiment 4

A network device 5 in FIG. 5A according to Embodiment 4 further includes a screen display unit 501 in addition to the configuration of the network devices according to Embodiments 1 to 3. Although FIG. 5A illustrates an example of the network device 5 including the bypass connection 201, the network device 5 may include the signal loop-back processing unit 102 in FIG. 1 instead of the bypass connection 201. Furthermore, the network device 5 may include the data receiving unit 4001 in FIG. 4A.

The screen display unit 501 obtains information on a start-up state of the Ethernet control unit 101 from the Ethernet control unit 101 itself. Furthermore, the screen display unit 501 displays a start-up state of the Ethernet control unit 101 on a screen. Furthermore, the screen display unit 501 may obtain, from the power control unit 302, a state notification indicating whether the network device 5 is turned ON or OFF, and display, on the screen, (i) information indicating whether the network device 5 is turned ON or OFF, or (ii) information on the power consumption of the network device 5.

Figure 5B:
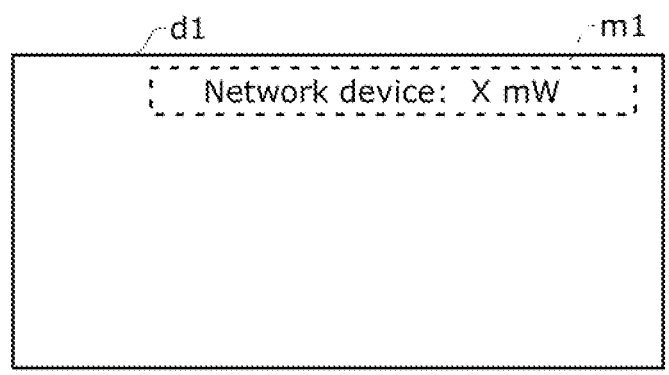
FIG. 5B illustrates an example of a display screen of a network device according to Embodiment 4.
Figure 5C:
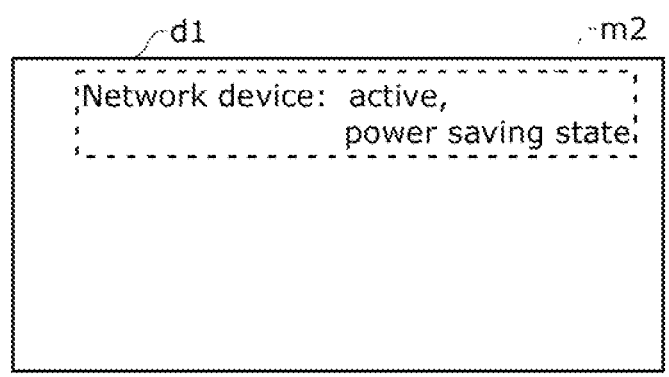
FIG. 5C illustrates an example of a display screen of a network device according to Embodiment 4.

Each of FIGS. 5B and 5C illustrates an example of a display screen of the network device 5 according to Embodiment 4. In FIG. 5B, a message m1 "Network device: X mW" indicating the current power consumption of the network device 5 is displayed on a part of a screen d1. In FIG. 5C, a message m2 "Network device: active, power saving state" indicating the current power consumption of the network device 5 is displayed on a part of the screen d1.

The screen display unit 501 may be any as long as information can be visually displayed, such as a display screen of a television and an electronic information display unit in a video recorder. The other operations such as the operation for looping back the link signal to the external network device A1, the method of detecting the change in the signal different from the link signal, the operation of switching power between the Ethernet control unit 101 and the network device 5 by the power control unit 302, and the operation of storing the Ethernet frames in the data receiving unit 4001 are the same as those in Embodiments 1 to 3. Thus, the description thereof is omitted.

According to Embodiments 1 to 3, the power of the network devices can be saved, and an operating state in power saving or the power consumption can be presented to the user.

The processes in each of Embodiments may be performed by software. The software may be distributed by downloading, or by recording the software in a recording medium, such as a CD-ROM. Furthermore, the processes in each of Embodiments may be performed by hardware (a dedicated circuit).

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The network device according to the present invention is useful as, for example, a network repeater, and a television and a hard disk recorder each of which has a network function.

The invention claimed is:

1. A network device comprising:
a connector connected to a network;
a receiving line connected to the connector;
a transmitting line connected to the connector;
a communication control unit configured to control communication with an external network device by receiving a signal from the network through the connector and the receiving line, and transmitting the signal to the network through the transmitting line and the connector;
a loop-back processing unit configured to loop back the signal transmitted through the receiving line, to the transmitting line when the communication control unit is in a power-off state or a standby state;
a power control unit configured to turn ON or OFF the communication control unit; and
a monitoring unit configured to monitor the signal transmitted through the receiving line, and determine whether or not the signal has been transmitted to the network device,
wherein the power control unit is configured to turn ON the communication control unit when the monitoring unit determines that the signal has been transmitted to the network device,
wherein the network device further comprises a receiving unit configured to store the signal transmitted through the receiving line when the communication control unit is in the power-off state or the standby state,
wherein the communication control unit is further configured to process the signal stored by the receiving unit when the communication control unit is turned ON, and
wherein the receiving unit is configured to store the signal determined by the monitoring unit as having been transmitted to the network device, the stored signal arriving from a time when the network device is in the power-off state or the standby state to a time when the network device is turned ON.

2. A network device comprising:
a connector connected to a network;
a receiving line connected to the connector;
a transmitting line connected to the connector;
a communication control unit configured to control communication with an external network device by receiving a signal from the network through the connector and the receiving line, and transmitting the signal to the network through the transmitting line and the connector;
a loop-back processing unit configured to loop back the signal transmitted through the receiving line, to the transmitting line when the communication control unit is in a power-off state or a standby state;
a power control unit configured to turn ON or OFF the communication control unit; and
a monitoring unit configured to monitor the signal transmitted through the receiving line, and determine whether or not the signal has been transmitted to the network device,
wherein the power control unit is configured to turn ON the network device when the monitoring unit determines that the signal has been transmitted to the network device,
wherein the network device further comprises a receiving unit configured to store the signal transmitted through the receiving line when the network device is in the power-off state or the standby state,
wherein the communication control unit is further configured to process the signal stored by the receiving unit when the network device is turned ON, and
wherein the receiving unit is configured to store the signal determined by the monitoring unit as having been transmitted to the network device, the stored signal arriving from a time when the network device is in the power-off state or the standby state to a time when the network device is turned ON.

* * * * *